United States Patent [19]
Wolfsdorf

[11] Patent Number: 6,142,536
[45] Date of Patent: Nov. 7, 2000

[54] PIPE COUPLING

[75] Inventor: Klaus D. Wolfsdorf, Denkingen, Germany

[73] Assignee: Alia Engineering AG, Germany

[21] Appl. No.: 09/073,588

[22] Filed: May 6, 1998

[51] Int. Cl.[7] .................................................. F16L 17/02
[52] U.S. Cl. ........................ 285/112; 285/308; 285/317; 285/340; 285/369
[58] Field of Search .................................. 285/340, 369, 285/112, 308, 317

[56] References Cited

U.S. PATENT DOCUMENTS

| | | | |
|---|---|---|---|
| 3,645,567 | 2/1972 | Reinker | ..................................... 285/340 |
| 4,181,329 | 1/1980 | Helm . | |
| 4,647,083 | 3/1987 | Hashimoto . | |
| 4,717,179 | 1/1988 | Haberstock et al. | ................. 285/340 X |
| 4,842,306 | 6/1989 | Zeidler et al. . | |
| 5,094,492 | 3/1992 | Levivier | .............................. 285/340 X |
| 5,911,446 | 6/1999 | McLennan et al. | ................. 385/340 X |

FOREIGN PATENT DOCUMENTS

| | | |
|---|---|---|
| 2158816 | 7/1972 | Germany . |
| 74 07 141 U | 11/1974 | Germany . |
| 2836557 | 8/1978 | Germany . |
| 3524621 | 7/1985 | Germany . |

*Primary Examiner*—Dave W. Arola
*Attorney, Agent, or Firm*—Douglas J. Christensen

[57] ABSTRACT

A pipe coupling for joining a pair of pipe ends has a sleeve containing a lip seal and a pair of opposing mirror image annular support bodies each with a first end engaged with the sleeve and each extending axially away from the sleeve to a second end with a radial wall having a circular opening sized for the pipe ends at the opposite end. Each supporting body containing a clamping member adjacent the radial wall and intermediate the supporting body and outer surface of the pipe end. The clamping member pivotal between an inclined position and an upright position and biased to the upright clamping position. Pipe ends are inserted with the clamping members in the inclined position. After insertion, an extraction force on the pipe ends moves the clamping members to an upright clamping position. A circumferential band secures the first ends of the supporting bodies to the sleeve.

20 Claims, 3 Drawing Sheets

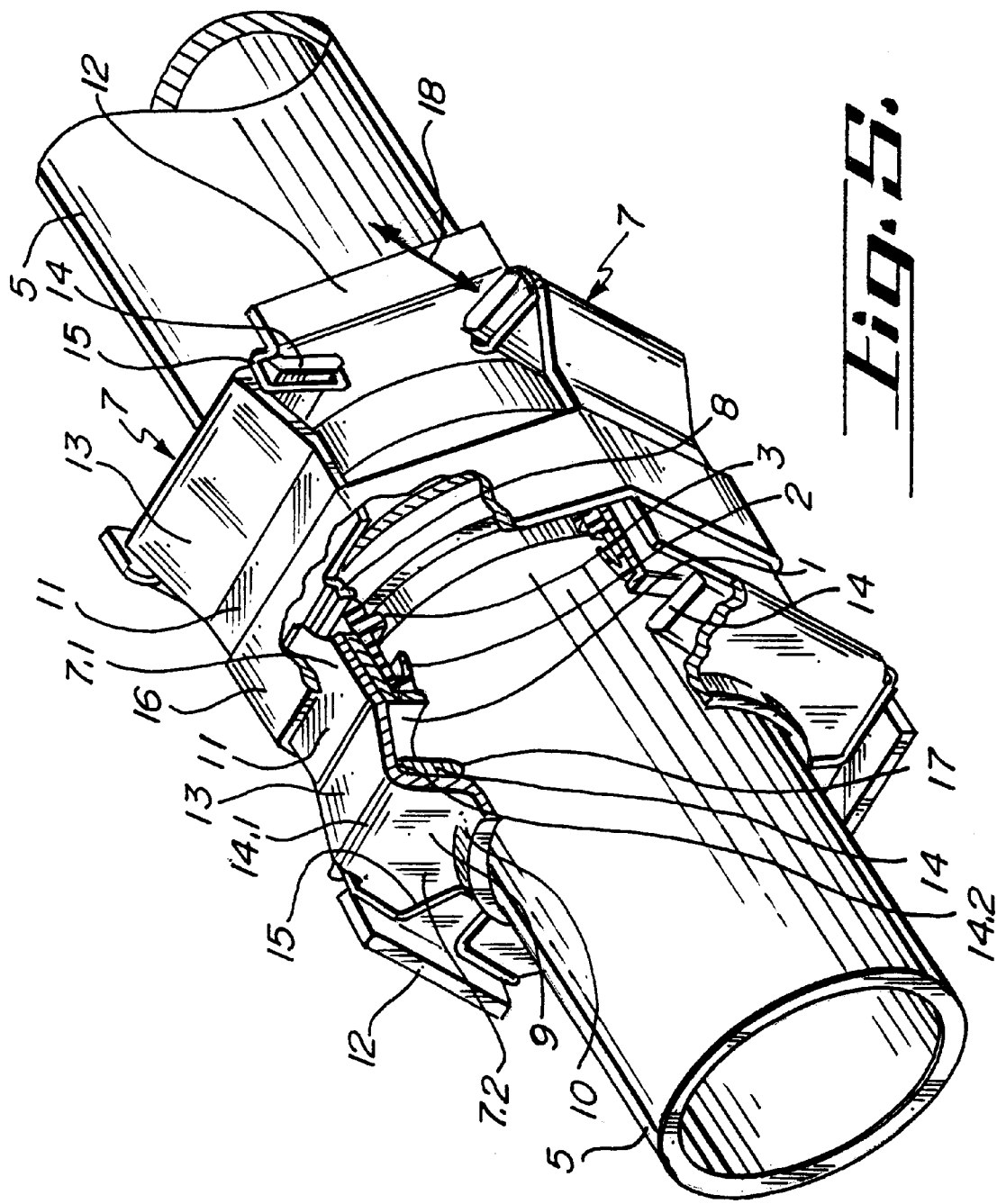

PIPE COUPLING

BACKGROUND OF THE INVENTION

The invention relates to a pipe coupling, more particularly to pipe couplings with locking members.

German Patent No. 3,524,621 discloses a pipe coupling in which a sleeve is provided, and this sleeve accommodates a lip seal which at the same time has an inside annular stop for the pipe ends of two pipes to be pushed in. In addition, and separated herefrom in terms of construction and assembly, an outer clip is provided and is to be assembled by means of tools, this clip serving as a supporting body for locking elements which, during extraction stress on inserted pipes, catch in the respective inserted pipe ends while being straightened up radially. Here, the locking elements have a complicated form with a roughly oval cross-section and are awkward to assemble.

In addition, German Patent 3,202,367 discloses a pipe coupling which has a one-piece, cylindrical socket body provided with grooves encircling on the inside, the grooves having O-rings on the one hand and locking elements on the other hand. The latter are circular-segment-like and are otherwise also relatively complicated from, so that they can be held via an O-ring inserted into the corresponding groove. Despite the one-piece socket, this leads to a design which is also elaborate with regard to assembly.

SUMMARY OF THE INVENTION

The object of the invention is to provide a pipe coupling with a simplified design. A pipe coupling for joining a pair of pipe ends has a sleeve containing a lip seal and a pair of opposing mirror image annular support bodies each with a first end engaged with the sleeve and each extending axially away from the sleeve to a second end with a radial wall having a circular opening sized for the pipe ends at the opposite end. Each supporting body contains a clamping member adjacent the radial wall and intermediate the supporting body and outer surface of the pipe end. The clamping member is pivotal between an inclined position and an upright position and biased to the upright clamping position. Pipe ends are inserted with the clamping members in the inclined position. After insertion, extraction force on the pipe ends moves the clamping members to an upright clamping position. A circumferential band secures the first ends of the supporting bodies to the sleeve.

Such a pipe coupling, on the one hand, is a uniform component and, on the other hand, has locking elements of simple form which permit simple assembly as well as subsequent disassembly.

Further developments of the invention can be gathered from the following description and the claims. The invention is explained in more detail below with reference to an exemplary embodiment shown in the attached drawings.

BRIEF DESCRIPTION OF THE DRAWINGS

FIG. 5 shows a perspective and partly cutaway view of the pipe coupling of FIGS. 1, 2.

DETAILED SPECIFICATION

Figure 1:
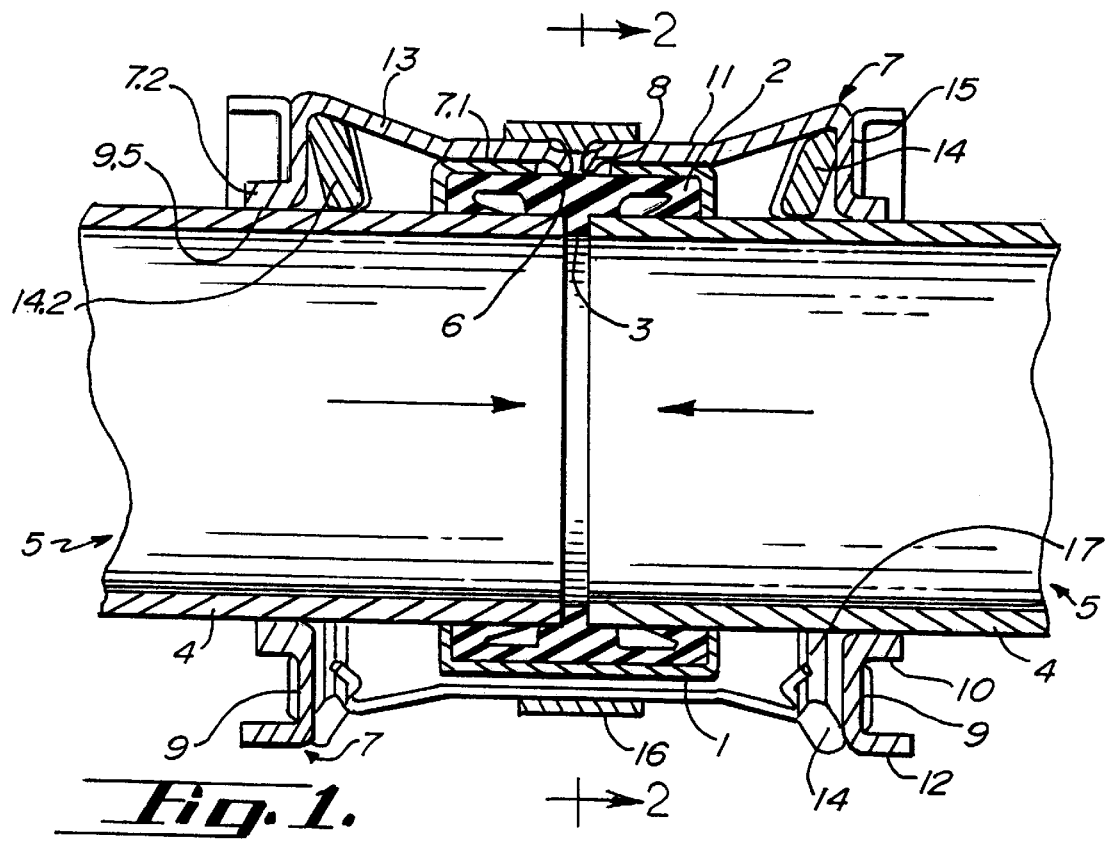
FIG. 1 shows a pipe coupling in axial section.
Figure 2:
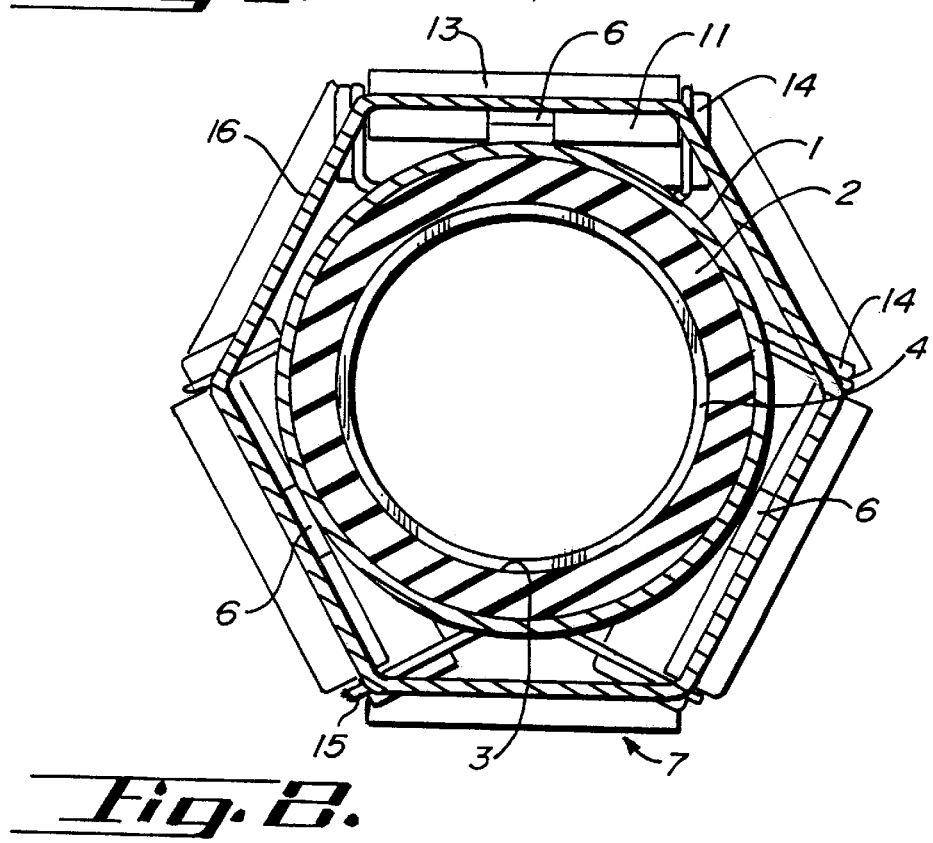
FIG. 2 shows a radial section of the pipe coupling of FIG. 1 along line II—II.
Figure 3:
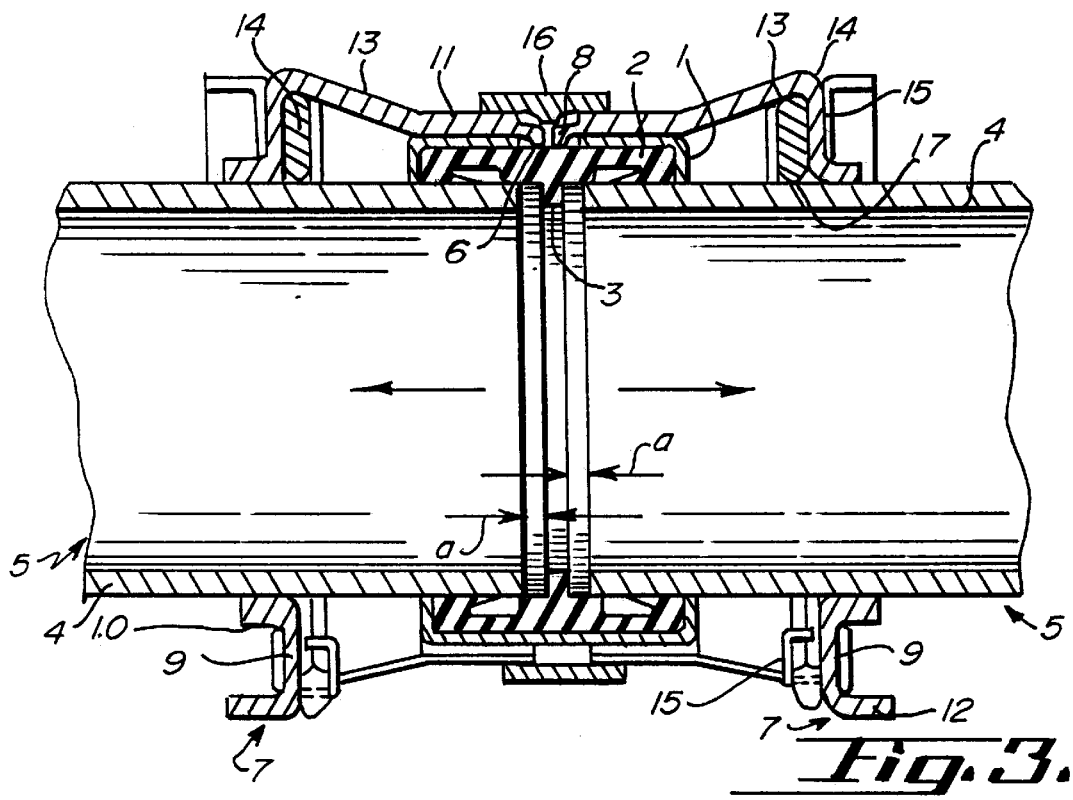
FIGS. 3 and 4 show the pipe coupling in accordance with FIG. 1 after the admission of pressure and, respectively, in end view.
Figure 4:
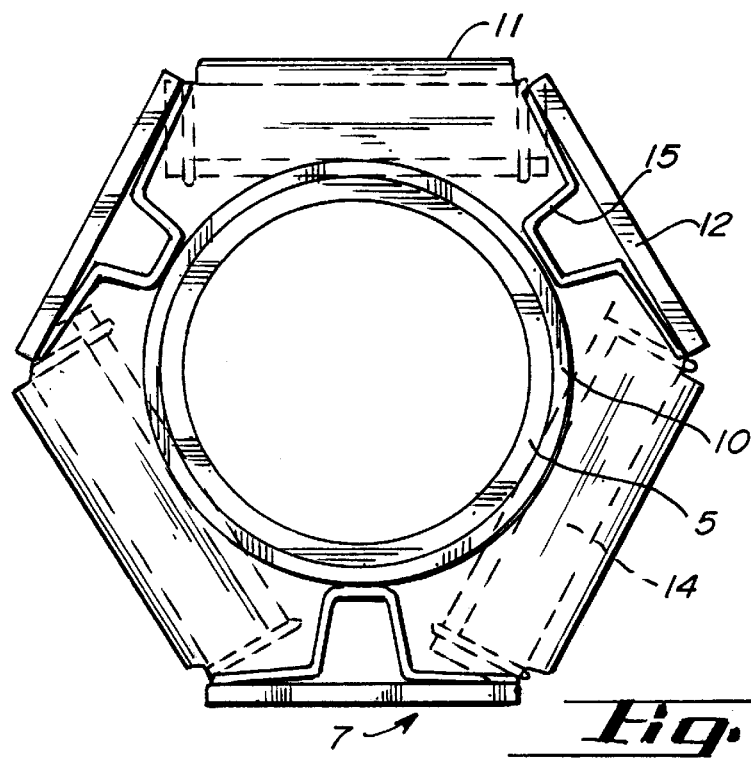

Referring to the figures, the pipe coupling shown comprises a sleeve 1 with a C-shaped cross-section in the axial direction, the interior of the sleeve forms a sealing chamber, which accommodates a sealing collar 2 designed as a lip seal. The sealing collar 2 is provided with a stop ring 3, which extends radially inwards from the sealing collar 2, is surrounded by supporting shoulders and is intended for two pipe ends 4, to be accommodated by the pipe coupling, of pipes 5 to be connected, the inside diameter of the stop ring 3 being greater than or equal to the inside diameter of the pipes 5.

In its center region, the sleeve 1 is provided with a plurality of rectangular recesses 6 arranged at a distance from one another in the peripheral direction, three recess 6 offset in the peripheral direction by 120° being provided in the present exemplary embodiment.

Furthermore, the pipe coupling comprises two identical supporting bodies 7, which are arranged in mirror image to one another and are provided with nubs or noses 8, which engage in the recesses 6 and thus hold the supporting bodies 7 on the sleeve 1.

The respective supporting body 7 is preferably conceived as a sheet-metal part and comprises (in the present exemplary embodiment) a first end 7.1, a second end 7.2, a radial wall 9, which is hexagonal on the outer periphery, extends perpendicularly to the pipe axis and has, on its inside, an opening 9.5 with an annular flange 10 directed outwards and from the outer periphery of which three lugs 11, which have the tabs or noses 8 at their ends, are bent over inwards towards the sleeve 1, whereas three further lugs 12, which alternate with the lugs 11, are directed axially outwards. The radial wall 9 serves to absorb force free of distortion, whereas the lugs 12 stabilize the radial wall 9.

Towards the radial wall 9, the lugs 11 have a roughly conical ascending region 13 which is directed outwards. Adjacent to the radial wall 9, a rectangular, flat clamping plate 14 serving as locking element is inserted in each case in the region with a bend or fold 14.1 creating an inner recess 14.2 between the radial wall 9 and the conical ascending regions 13 of the lugs 11. The clamping plates 14 pivot within the recess 14.2 and are held and biased in the extraction direction by springs 15, which are shaped springs bent from wire. Here, in each case one spring 15 holds two adjacent ends of two adjacent clamping plates 14 and is at the same time supported on the respective intermediate lug 12 directed outwards.

The recesses 6 accommodating the tabs or noses 8 provide for rotationally locked alignment of the supporting bodies 7 with respect to the sleeve 1 as well as for their longitudinal orientation and absorb the axial forces of the pipes 5 moving apart. In this arrangement, a circumferential band 16, if need be in two parts, prevents the noses 8 from shifting out of the recesses 6.

To assemble the pipe coupling, the sealing collar 2 can be inserted into the sleeve 1, which is still open on one side and is then beaded down. The supporting bodies 7 are provided with the springs 15 and the clamping plates 14 are positioned. After that, first of all one supporting body 7 is pushed onto the sleeve 1, the band 16 is pushed up to the stop formed by the conical ascending regions 13, the second supporting body 7 is pushed on, and the band 16 is centered. No clamping screws are required in order to assemble the pipe coupling.

To connect two pipes 5, they should be cut off straight and be free of burr in order not to damage the sealing collar 2. The pipes 5 are pushed into the pipe coupling up to the stop ring 3. In the process, the clamping plates 14 give way against the spring prestressing. If pressure is now admitted to the pipes 5 or if another extraction force is exerted on them, they move apart by a dimension "a", in the course of which the hardened clamping plates 14 press into the respective pipe end 4 with their cutting edges 17, which face the pipe 5. In the process, the clamping plates 14 can only move up to the radial wall 9 of the respective supporting body 7, which radial wall 9 serves as a stop for the clamping plates 14. Due to the pressing-in of the clamping plates 14 into the adjacent pipe end 4, large axial forces can be absorbed. The pipe assembly can therefore be carried out without tools.

Since the clamping plates 14, which project laterally from under the lugs 11 and are held there by the springs 15, are accessible from outside, they can be pushed out by means of a tool in order to release the pipe coupling, as indicated by the arrow 18 in FIG. 5.

When the demands imposed are correspondingly small, it may possibly be sufficient for the supporting body 7 to accommodate only one clamping plate. It may also have a square outer periphery and accommodate two clamping plates 14, or have an octagonal outer periphery and accommodate four clamping plates 14, etc.

The clamping plates 14 may be of conical design in their longitudinal profile in order to be able to react by means of appropriate adjustment (arrow direction 18) to larger differences in diameter between the pipes 5 to be accommodated.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A pipe coupling comprising:
    a sealing collar;
    a sleeve defining an interior sealing chamber for accommodating said sealing collar, said sleeve and said sealing collar configured to cooperate to sealingly engage adjacent end portions of two pipes to be coupled;
    a first supporting body with an interior accommodating said sleeve; and
    at least one locking element for each said end portion of the two pipes to be coupled, each said locking element being supported by said first supporting body, each said locking element catching the pipe end portion when said pipe end portion is under an extraction stress, thereby radially raising the locking element to a generally radial clamping position;
    wherein each locking element includes a first rectangular clamping plate and spring means, the spring means supported by the first supporting body, the first clamping plate biased by said spring means in the direction of the extraction stress; and
    wherein said first supporting body is held on said sleeve.

2. The pipe coupling according to claim 1, the first supporting body further comprising at least one nose and in which the first supporting body is hooked in position on the sleeve via said nose.

3. The pipe coupling according to claim 1, further comprising a band and in which the first supporting body is held engaging the sleeve by the band disposed on an outer periphery of the first supporting body.

4. The pipe coupling according to claim 1, wherein the first supporting body includes a radial wall generally perpendicular to an axis of said two pipes to be coupled, the radial wall configured to be a stop for the first clamping plate when the first clamping plate is being raised to the clamping position.

5. The pipe coupling according to claim 1, wherein the first supporting body accommodates the first clamping plate such that the first clamping plate can be manually displaced from the clamping position to the first inclined position, thereby releasing the clamped pipe end portion.

6. The pipe coupling according to claim 1, wherein the first supporting body comprises first and second lugs, said first and second lugs alternately extending axially away from and axially towards the sleeve, the first lug supporting the first clamping plate and the second lug supporting the spring means.

7. The pipe coupling according to claim 1, wherein the locking element comprises a second clamping plate, the spring means being configured to engage said first and second clamping plates on two adjacent ends thereof.

8. The pipe coupling according to claim 1, the sealing collar including a stop ring configured to accommodate the two pipe end portions disposed within the pipe coupling, an inside diameter of the stop ring being greater than the inside diameter of the pipe ends.

9. The pipe coupling according to claim 1, further comprising a second supporting body and wherein said first and second supporting bodies are generally disposable on the sleeve to be mirror images to one another.

10. The pipe coupling according to claim 1, wherein the first clamping plate includes a generally conical longitudinal profile.

11. A pipe coupling for receiving a pair of axially aligned pipe ends with a circumferential surface, the pipe coupling comprising:
    an annular sleeve with a generally C-shaped cross-section in the axial direction, the sleeve defining a sealing chamber;
    an annular sealing collar in the sealing chamber;
    a pair of opposing annular supporting bodies each having a first end with a tab engaged with the sleeve and a second end with an axially displaced radial wall with a circular opening for receiving and restraining one of the pipe ends, each supporting body having an inwardly facing recess adjacent said radial wall; and
    a pair of locking members, one locking member for each supporting body, each locking member configured as a generally rectangular clamping plate and pivotally placed within the recess on the supporting body, each clamping plate having a pipe engaging edge biased in an extraction direction by springs on the supporting body whereby when the pair of pipe ends inserted in the pipe coupling are subjected to extraction stress, the locking members catch the circumferential surface of the pair of pipe ends and are straightened up radially to a clamping position, thereby providing a clamping force on the pipe ends.

12. The pipe coupling according to claim 11, wherein each supporting body has a plurality of tabs and is hooked in position on the sleeve by way of said tabs.

13. The pipe coupling according to claim 11, further comprising a band and wherein the first end of each supporting body has a lug, the tab held in engagement with the sleeve by the band disposed over the lugs of supporting bodies, thereby holding said lugs in position on the sleeve.

14. The pipe coupling according of claim 11, wherein the radial wall of each supporting body is generally perpendicular to the pipe axis and is configured as a stop for each respective clamping plate when the respective pipe end is displaced in an extraction direction.

15. The pipe coupling according to claim 11, wherein the clamping plates are accessible from an exterior of the pipe coupling, whereby each clamping plate may be externally released from the clamping position.

16. A pipe coupling according to claim 11, further comprising a plurality of clamping plates and a plurality of springs for each supporting body, wherein each supporting body has a plurality of lugs at said radial wall, said lugs alternatively extending axially away from the sleeve and axially toward the sleeve, the lugs extending away from the sleeve for supporting a plurality of springs and the lugs extending towards the sleeve for supporting the pair of clamping plates.

17. The pipe coupling according to claim 16, wherein each spring engages two adjacent ends of two adjacent clamping plates.

18. The pipe coupling according to claim 11, wherein the sealing collar includes a stop ring, the stop ring configured to be accommodated by the pipe coupling, the inside diameter of the stop ring being greater than the inside diameters of the pipe ends.

19. The pipe coupling according to claim 11, wherein the two supporting bodies are disposed as mirror images to one another on the sleeve.

20. The pipe coupling according to claim 11, wherein the clamping plate includes generally conical longitudinal profile.

* * * * *

UNITED STATES PATENT AND TRADEMARK OFFICE
CERTIFICATE OF CORRECTION

PATENT NO. : 6,142,536
DATED : November 7, 2000
INVENTOR(S) : Klaus D. Wolfsdorf It is certified that error appears in the above-identified patent and that said Letters Patent is hereby corrected as shown below:

<u>Title page,</u>
Item [73], Assignee should read: -- Alia Engineering AG --Zug, Switzerland --, delete "Germany"

<u>Column 4,</u>
Line 8, insert -- second -- before "clamping".

Signed and Sealed this

Ninth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,142,536
DATED          : November 7, 2000
INVENTOR(S)    : Klaus D. Wolfsdorf It is certified that error appears in the above-identified patent and that said Letters Patent is hereby corrected as shown below:

<u>Title page,</u>
Insert Item -- [30]     Foreign Priority Application Data
            May 6, 1977    (DE) Germany        197 19 066 --.

Signed and Sealed this

Twenty-fifth Day of October, 2005

JON W. DUDAS
*Director of the United States Patent and Trademark Office*